US006907511B2

(12) United States Patent
Fallah et al.

(10) Patent No.: US 6,907,511 B2
(45) Date of Patent: Jun. 14, 2005

(54) REDUCING TRANSITIONS ON ADDRESS BUSES USING INSTRUCTION-SET-AWARE SYSTEM AND METHOD

(75) Inventors: Farzan Fallah, San Jose, CA (US); Yazdan Aghaghiri, Los Angeles, CA (US); Massoud Pedram, Los Angeles, CA (US)

(73) Assignees: Fujitsu Limited, Kanagawa (JP); University of Southern California, Los Angeles, CA (US)

( * ) Notice: Subject to any disclaimer, the term of this patent is extended or adjusted under 35 U.S.C. 154(b) by 283 days.

(21) Appl. No.: 10/342,418

(22) Filed: Jan. 14, 2003

(65) Prior Publication Data

US 2003/0101326 A1 May 29, 2003

Related U.S. Application Data

(63) Continuation-in-part of application No. 10/162,010, filed on Jun. 3, 2002, now Pat. No. 6,813,700.
(60) Provisional application No. 60/297,614, filed on Jun. 11, 2001, and provisional application No. 60/298,233, filed on Jun. 13, 2001.

(51) Int. Cl.[7] .............................................. G06F 12/00
(52) U.S. Cl. ........................ 711/204; 711/213; 711/220; 712/233; 712/237
(58) Field of Search ................................ 711/100, 200, 711/204, 211, 213, 217, 219, 220; 712/233, 237

(56) References Cited

U.S. PATENT DOCUMENTS 4,729,092 A * 3/1988 Lupton ....................... 711/213
4,860,197 A * 8/1989 Langendorf et al. ........ 712/238
4,905,141 A * 2/1990 Brenza ....................... 711/129
5,283,873 A * 2/1994 Steely et al. ................ 712/207
5,581,719 A * 12/1996 Steely et al. ................ 712/207
5,933,860 A * 8/1999 Emer et al. ................. 711/213
5,978,908 A * 11/1999 Cumming et al. .......... 712/240
6,167,509 A * 12/2000 Sites et al. .................. 712/237
6,289,444 B1 * 9/2001 Nair ........................... 712/243

OTHER PUBLICATIONS

L. Benini, G. De Micheli, E. Macii, D. Sciuto, C. Silvano, "Asymptotic Zero–Transition Activity Encoding for Address Buses in Low–Power Microprocessor–Based Systems," IEEE *7th Great Lakes Symposium on VLSI*, Urbana, IL, pp. 77–82, Mar. 1997.
W. Fornaciari, M. Polentarutti, D. Sciuto, C. Silvano, "Power Optimization of System–Level Address Buses Based on Software Profiling," *CODES*, pp. 29–33, 2000.
L. Benini, G. De Micheli, E. Macii, M. Poncono, S. Quer, "System–Level Power Optimization of Special Purpose Applications: The Beach Solution," *IEEE Symposium on Low Power Electronics and Design*, pp. 24–29, Aug. 1997.
P. Panda, N. Dutt, "Reducing Address Bus Transitions for Low Power Memory Mapping," European Design and Test Conference, pp. 63–67, Mar. 1996.

(Continued)

*Primary Examiner*—Tuan V. Thai
(74) *Attorney, Agent, or Firm*—Baker Botts L.L.P.

(57) ABSTRACT

An instruction-set-aware method for reducing transitions on an irredundant address bus comprises receiving a first address for communication to a memory on an irredundant address bus. The method retrieves an instruction from a memory location indicated by the first address, transmits the instruction on a data bus, and determines a category of the instruction. The method predicts a second address based, at least in part, on the first address, the instruction, and the category of the instruction.

50 Claims, 5 Drawing Sheets

OTHER PUBLICATIONS

E. Musoll, T. Lang, J. Cortadella, "Exploiting the locality of memory references to reduce the address bus energy," Proceedings of International Symposium on Low Power Electronics and Design, Monterey, CA, pp. 202–207, Aug. 1997.

M.R. Stan, W.P. Burleson, "Bus–Invert Coding for Low Power I/O," IEEE Transactions on VLSI Systems, vol. 3, No .1, Mar. 1995.

M. Mamidipaka, D. Hirschberg, N. Dutt, "Low Power Address Encoding using Self–Organizing Lists," International Symposium on Low Power Electronics and Design, Aug. 2001.

S. Ramprasad, N. Shanbhag, I. Hajj, "A Coding Framework for Low Power Address and Data Busses," IEEE Transactions on VLSI Systems, vol. 7, No. 2, Jun. 1999.

Y. Aghaghiri, F. Fallah, M. Pedram, "Irredundant Address Bus Encoding for Low Power," International Symposium on Low Power Electronics and Design, pp. 182–187, Aug. 2001.

L. Macchiarulo, E. Macii, M. Poncino, "Low–energy for Deep–submicron Address Buses," International Symposium on Low Power Electronics and Design, pp. 176–181, Aug. 2001.

S. Iman, M. Pedram, "POSE: Power Optimization and Synthesis Environment," Proc. of 33rd Design Automation Conference, pp. 21–26, Jun. 1996.

P.P. Sotiriadis, A. Wang, A. Chandrakasan, "Transition Pattern Coding: An approach to reduce Energy in Interconnect".

N. Chang, K. Kim, J. Cho, "Bus Encoding for Low–Power High–Performance Memory Systems," 37th Conference on Design Automation, Jun. 2000.

P. Chang, E. Hao, Y.N. Patt, "Target Prediction for Indirect Jumps," 24th International Symposium on Computer Architecture, Jun. 1997.

J.E. Smith, "A Study of Branch Prediction Strategies," 8th International Sympoisum on Computer Architecture, pp. 202–215, May 1981.

Y. Shin, S.I. Chae, K. Choi, "Partial Bus–Invert Coding for Power Optimization of System Level Bus," ISLPED '98, pp. 127–127, Aug. 1998.

M.R. Stan, P. Burleson, "Low–Power Encodings for Global Communication in CMOS VLSI," IEEE Transactions on VLSI Systems, vol. 5, No. 4, Dec. 1997.

L. Benini, G. de Micheli, E. Macii, D. Sciuto, C. Silvano, "Address Bus Encoding Techniques for System–Level Power Optimization," DATE–98, pp. 861–866, Feb. 1998.

S. Komatsu, M. Ikeda, K. Asada, "Low Power Chip Interface based on Bus Data Encoding with Adaptive Code–book Method".

\* cited by examiner

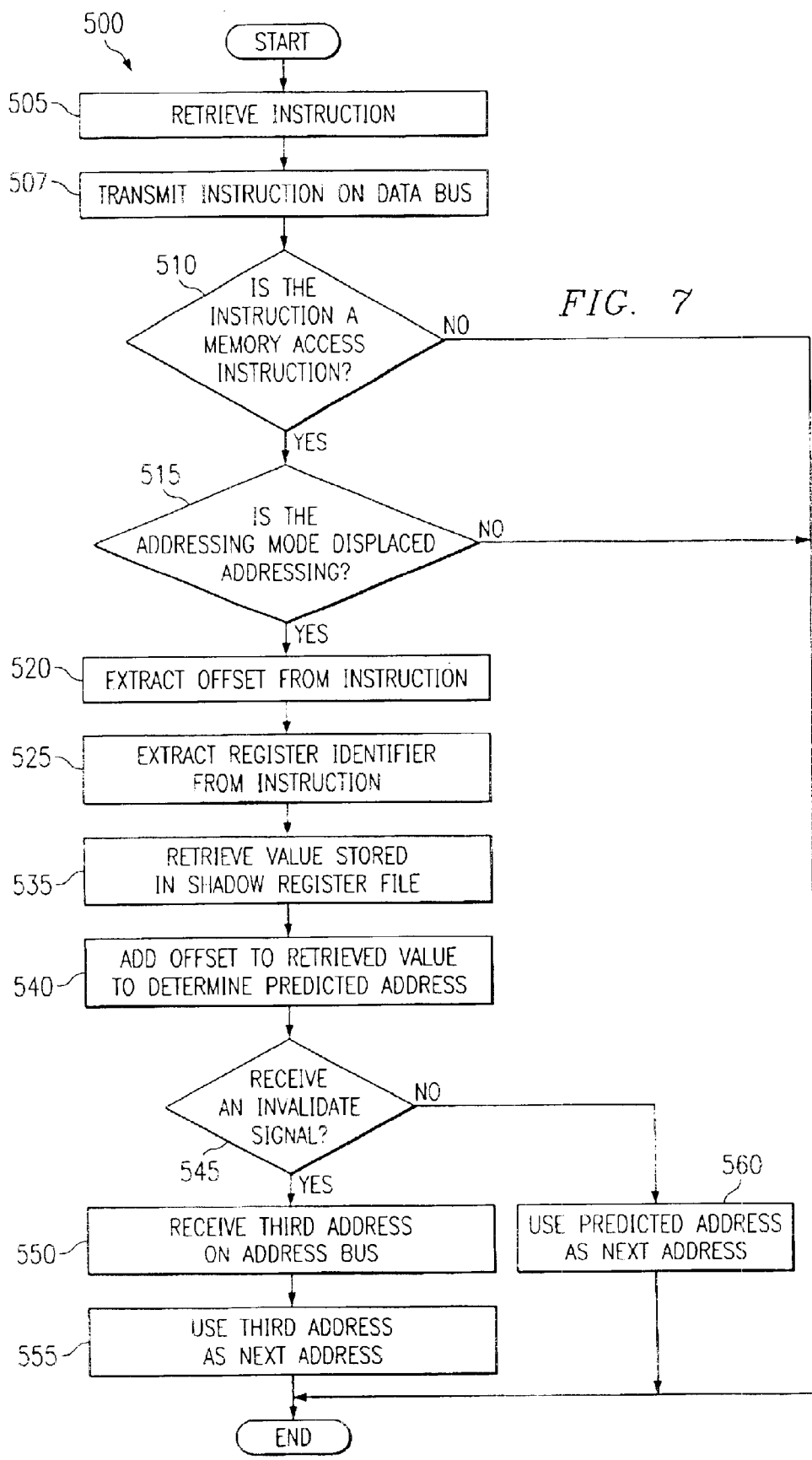

REDUCING TRANSITIONS ON ADDRESS BUSES USING INSTRUCTION-SET-AWARE SYSTEM AND METHOD

RELATED APPLICATIONS

This application is a continuation-in-part of U.S. patent application Ser. No. 10/162,010 filed Jun. 3, 2002, now U.S. Pat. No. 6,813,700 entitled "REDUCTION OF BUS SWITCHING ACTIVITY," which claims the priority under 35 U.S.C. §119 of provisional application Ser. No. 60/297,614 filed Jun. 11, 2001, entitled "ALBORZ: ADDRESS LEVEL BUS POWER OPTIMIZATION," and provisional application Ser. No. 60/298,233 filed Jun. 13, 2001, entitled "METHOD AND APPARATUS FOR BUS ENCODING."

TECHNICAL FIELD OF THE INVENTION

The present invention relates generally to circuit design and, more particularly, to reduction of transitions on address buses.

BACKGROUND OF THE INVENTION

Low power consumption is normally an important design feature of conventional computer systems. In traditional computer systems, addresses are generated in the processor and communicated via a bus to memory for access of an instruction or data. The switching activity of these address communications on the bus consume a considerable amount of energy that is a large portion of the total power consumption of these systems.

SUMMARY OF THE INVENTION

In accordance with the present invention, techniques for reducing transitions on address buses are provided. According to particular embodiments, these techniques reduce power consumption of electronic devices by reducing transitions on address buses.

According to a particular embodiment, an instruction-set-aware method for reducing transitions on an irredundant address bus comprises receiving a first address for communication to a memory on an irredundant address bus. The method retrieves an instruction from a memory location indicated by the first address, transmits the instruction on a data bus, and determines a category of the instruction. The method predicts a second address based, at least in part, on the first address, the instruction, and the category of the instruction.

Embodiments of the invention may provide various technical advantages. Certain embodiments provide a memory that retains information regarding the format of instructions. This information may allow the memory to calculate or predict instruction or data addresses. Therefore, the processor may not be required to send every address over the address bus, resulting in reduced transitions on the address bus. Further advantages may include reduced power dissipation, reduced delay in memory access, and others.

Other technical advantages of the present invention will be readily apparent to one skilled in the art. Moreover, while specific advantages have been enumerated above, various embodiments of the invention may have none, some or all of these advantages.

BRIEF DESCRIPTION OF THE DRAWINGS

For a more complete understanding of the present invention and its advantages, reference is now made to the following descriptions, taken in conjunction with the accompanying drawings, in which:

FIG. 7 is a flowchart illustrating a method for predicting data addresses using the shadow register file.

DETAILED DESCRIPTION OF THE DRAWINGS

Figure 1:
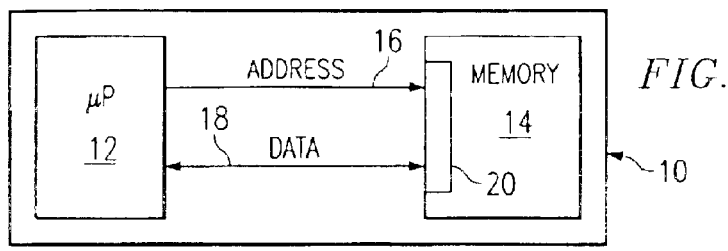
FIG. 1 illustrates a portion of a processing system for predicting communications sent across an address bus according to various embodiments of the present invention.

FIG. 1 illustrates a portion of a processing system indicated at 10, that includes a microprocessor 12 and a memory 14 coupled to each other using an address bus 16 and a data bus 18. To reduce transitions on address bus 16, system 10 includes a prediction module 20 that is internal to memory 14. While prediction module 20 is illustrated as internal to memory 14, in certain embodiments prediction module 20 is external to memory 14. In general, prediction module 20 reduces transitions on address bus 16 using one or more address prediction techniques. It will be understood that while these techniques are described using address bus 16, system 10 may use the invention to reduce transitions on a multiplexed bus, but for simplicity will be referred to as address bus 16.

In one aspect of operation, microprocessor 12 requests communications of data to and from memory 14 using address bus 16. Microprocessor 12 and memory 14 exchange data on data bus 18 based on the values of address bus 16. Setting values on address bus 16 and data bus 18 uses power, often proportionate to the number of changes in the value of the bus. For example, a change from an address of 00 hex to FF hex consumes more power than a change from 00 hex to 01 hex. Thus, reducing communication of addresses on address bus 16 reduces transitions and can reduce power consumption of the bus. Therefore, the addition of prediction module 20 can produce a net decrease in power consumption of system 10 by reducing transitions on address bus 16.

To reduce transitions on address bus 16, prediction module 20 uses one or more irredundant techniques to predict address values to be received on address bus 16. If these predictions are correct, microprocessor 12 need not communicate address values on address bus 16. To determine whether prediction module 20 predicted the correct next address, microprocessor 12 uses similar techniques to calculate or predict the next address. Microprocessor 12 compares its predicted next address to the actual next address. If microprocessor 12 successfully predicted the next address, then microprocessor 12 recognizes that memory 14 determined the correct address and does not communicate the next address to memory 14 on address bus 16. Otherwise, microprocessor 12 communicates the actual next address to memory 14 on address bus 16. Prediction module 20 recognizes that its predicted next address is incorrect, or invalid, if it receives the actual next address on address bus 16.

Prediction module 20 may predict, or calculate, next addresses using different techniques for different instruction categories, including "control flow" instructions (predicting instruction addresses) and/or "memory access" instructions (predicting data addresses). It should be understood that while different techniques are used to predict instruction addresses and data addresses, prediction module 20 may integrate the multiple techniques that are appropriate for both types of addresses. Predicting addresses may lead to a reduction in the switched capacitance on address bus 16 or multiplexed bus, thereby reducing power consumption.

Figure 2:
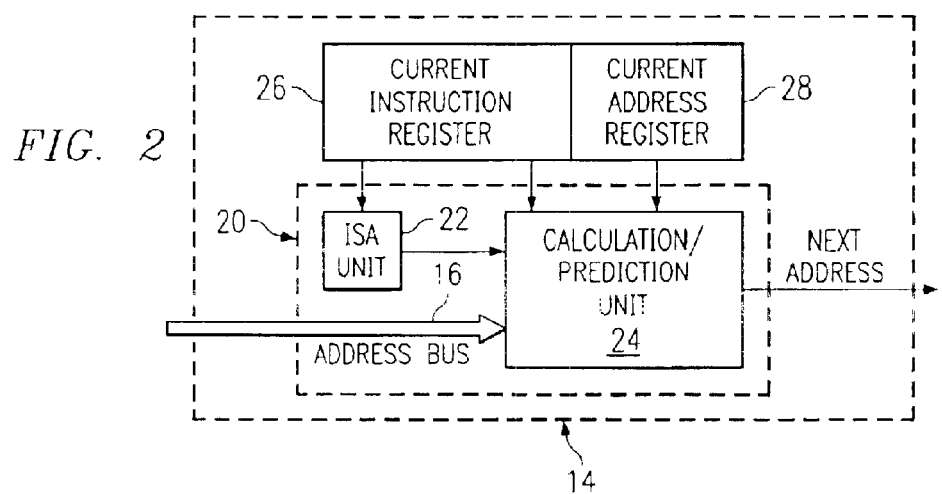
FIG. 2 is a block diagram illustrating a generic prediction module in memory.

FIG. 2 is a block diagram illustrating a generic prediction module 20 in memory 14. Prediction module 20 includes ISA (Instruction Set Aware) unit 22 and calculation/prediction unit 24. ISA Unit 22 allows prediction module 20 to determine certain characteristics of instructions that it will use in predicting the next address. Calculation prediction unit 24 predicts the next address based on the information from ISA unit 22. Prediction module 20 receives an instruction and an address as input from a current instruction register 26 and a current address register 28, respectively. As described above, each instruction includes an instruction category that determines whether the next address is an instruction address or a data address. The instruction category of the next instruction may also be determined based on the category of the current instruction. In one aspect of operation, ISA unit 22 retrieves the current instruction and identifies the instruction category. ISA unit 22 then determines the appropriate technique to predict the next address. Calculation/prediction unit 24 receives the current address and generates the next address based, at least in part, on the current instruction, current address, and input from ISA unit 22. According to particular embodiments, calculation/prediction unit 24 generates the next address according to whether the next address is an instruction address or a data address.

If the next address is an instruction address, ISA unit 22 then determines if the current instruction is a control flow or non-control flow instruction. If the instruction is a non-control flow instruction, then the next address and current address should be sequential. Therefore, ISA unit 22 communicates the flow type of the instruction to calculation/prediction unit 24. Calculation/prediction unit 24 adds one to the current address to predict the next address given a non-control flow instruction.

If ISA unit 22 determines that the current instruction is a control flow instruction, then the current address and the next address are probably not sequential. Control flow instructions may generally be divided into two types: branches and jumps. Generally, a branch instruction includes any control flow instruction that may cause a forward or backward movement in the execution flow of a program based on a condition. The degree of movement is normally based on an offset stored in the instruction. Jump instructions are similar to branch instructions, but do not include conditions. Jump instruction may instruct microprocessor 12 to jump, jump-and-link, jump-register, or execute any other deterministic non-sequential movement. Like branch instructions, the degree of movement in each jump and jump-and-link instruction is based on an offset stored in the instruction. Jump-register instructions are indirect jumps that use the value of a register to determine the target of the movement. In effect, the target of each of the various jump instructions may be unknown at execution time.

As described above, branches generally include a condition that may or may not be met. In one embodiment, if the condition is not met, then the next address is normally one step, or stride, more than the current address. If the condition is met, then the offset included in instruction 26 allows calculation/prediction unit 24 to predict the next address by adding the offset to the current address. But whether or not to take the branch may not be known by memory 14 or prediction module 20. Therefore, prediction module 20 may use a prediction scheme to attempt to predict whether a branch will be taken, thereby reducing the related transitions on address bus 18.

One exemplary prediction scheme assumes that the condition of the branch is met. In this scheme, calculation/prediction unit 24 determines the target of the branch, or the next address, by adding the offset from the instruction to the current address. If the branch was taken, then no data need be sent on address bus 16. In the event that the branch was not taken, prediction unit 20 may receive a message on address bus 16 stating that the prediction was incorrect. Prediction unit 20 may then add one to the current address to calculate the next address. To signal that the assumption of prediction unit 24 is incorrect, microprocessor 12 may send a "branch not taken" message via, for example, a single bit transition on a specific line of address bus 16, as opposed to the full next address. This reduced-transition message notifies prediction unit 24 of the incorrect prediction, which then merely adds one stride to the current address to calculate the next address. While the preceding example demonstrates a particular prediction technique, it should be understood that any appropriate branch prediction scheme may be used.

Similar to branches, direct jump instructions cause a forward or backward movement in the execution flow by a known movement. Jump instructions are unconditional jumps in the program. Jump-and-link instructions are also direct jumps that are typically used to implement function calls through linking a return address to a special register. Normally, the jump-and-link instruction is, at some time, followed by a jump-register instruction to implement the return from the function. If ISA unit 22 determines that the current instruction is a jump or jump-and-link instruction, then calculation/prediction unit 24 may extract the offset from the current instruction and add it to the current address to determine the next address. With correct predictions, microprocessor 12 need not communicate address values, which may significantly reduce transitions on address bus 16 for jump and jump-and-link instructions. If the instruction is jump-and-link, prediction module 20 may also store the return address on a stack in memory 14 (not shown) to aid processing of the subsequent jump-register instruction.

Jump-register instructions are indirect jumps that may be used, for example, for function returns. The return address of the function, which is the target of the jump-register instruction, is saved to the stack in memory 14 when the function is called through a jump-and-link instruction. This allows prediction module 20 to predict the next address when there is the subsequent jump-register instruction that is used for the function return. If ISA unit 22 determines that the instruction is a jump-register instruction, then calculation/prediction unit 24 attempts to retrieve the next address from the stack. If the return address exists in the stack, then calculation/prediction unit 24 uses this return address as the next address. Otherwise, calculation/prediction unit 24 may be unable to predict the next address and reads the next address from address bus 16.

In a particular embodiment, microprocessor 12 includes a similar stack to ensure that memory 14 correctly calculates the next address for the jump-register instruction. When microprocessor 12 processes a jump-register instruction, microprocessor 12 searches its stack for the return address. If microprocessor 12 is unable to locate the return address, then the calculation/prediction unit 24 will be unable to accurately predict the next address. Therefore, in this circumstance, microprocessor 12 communicates the next address on address bus 16 to memory 14.

Alternatively, or in addition to, predicting instruction addresses, calculation/prediction unit 24 may also be capable of predicting data addresses. To efficiently predict data addresses, calculation/prediction unit 24 includes a shadow register file 240 (illustrated in FIG. 4) that substantially mirrors actual registers available to microprocessor 12 (not shown). Generally, shadow register file 240 includes one or more shadow registers that may store data addresses for access by calculation/prediction unit 24 to significantly reduce activity on address bus 16. In one embodiment, shadow register file 240 is initialized to zeroes. To make shadow register file 240 coherent with the actual registers in the microprocessor 12 calculation/prediction unit 24 may update one of the shadow registers when a data address is communicated on address bus 16 based on an addressing scheme used by system 10.

In one aspect of operation, system 10 uses displaced addressing as the addressing scheme. Displaced addressing is an addressing scheme that calculates the next address by adding an offset stored in the current instruction to a value in a particular register ($R_s$). The content of memory in the next address might be changed by the value of $R_d$ or it might be copied to $R_d$. This may be shown by:

$$R_d = \text{Mem}(R_s + \text{Offset})$$

For illustrative purposes only, system 10 will be described using displaced addressing. Although system 10 will be described with regard to displaced addressing, it should be understood that system 10 may use any other appropriate addressing scheme, including, for example, indexed, direct, immediate, register indirect, register indexed, register displaced, and direct register.

According to particular embodiments, calculation/prediction unit 24 updates shadow register file 240 when it receives one data address on address bus 16. For example, if shadow register file 240 was initialized, microprocessor 12 may communicate the data address stored in each actual register that is not accurately represented in shadow register file 240. Once the data address is received, calculation/prediction unit 24 extracts the offset from the current instruction and subtracts it from the data address (stored in register $R_d$) to calculate the value of the appropriate shadow register in shadow register file 240. This may be represented by a variation of the displaced addressing equation described above:

$$R_s = \text{Mem}(R_d - \text{Offset})$$

The local shadow register $R_s$ is then updated with this new value.

Microprocessor 12 may monitor which actual registers are represented in shadow register file 240. Monitoring shadow register file 240 allows microprocessor 12 to accurately and efficiently communicate only those addresses not known or predicted by memory 14. For example, shadow register file 240 may represent a subset of actual registers. In this example, microprocessor 12 sends any value stored in an actual register that is not mirrored in a shadow register. Also, in certain embodiments, microprocessor 12 can identify when an actual register is modified, from a move instruction for example, and communicate an updated value to calculation/prediction unit 24 so that the appropriate linked shadow register in memory 101 is updated. Otherwise, if the linked shadow register contains the appropriate value, then microprocessor 12 does not communicate any data on address bus 16. In this circumstance, calculation/prediction unit 24 extracts the shadow register identifier and the offset from current instruction 26. Calculation/prediction unit 24 then retrieves the value stored in the shadow register based on the register identifier and adds the offset to the shadow register value. The result is the predicted next data address.

Figure 3:
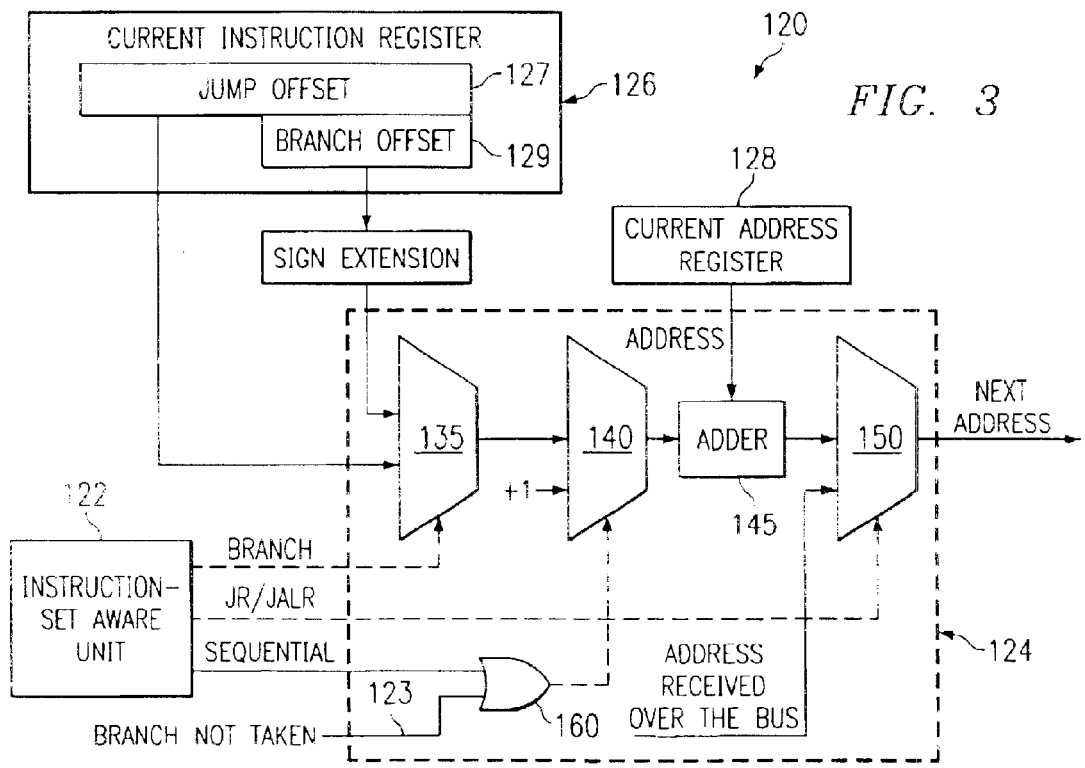
FIG. 3 is a block diagram illustrating one example of a prediction module for predicting instruction addresses.

FIG. 3 is a block diagram illustrating exemplary logic for a prediction module 120 for predicting a next instruction address to be sent across address bus 16. Prediction module 120 includes ISA unit 122 and calculation/prediction unit 124 to predict the next address based on the current instruction and the current address. The current instruction includes at least one offset such as, for example, a jump offset field 127 or a branch offset field 129. In this embodiment, ISA unit 122 determines whether the instruction is a branch, a jump-register, a jump-and-link-register, or a sequential (non-control flow) instruction. If ISA unit 122 determines that the instruction is not any of these, then the instruction is processed as a jump or jump-and-link.

If ISA unit 122 determines that the current instruction is a branch instruction, then a "branch" signal is sent to multiplexor 135. Multiplexor 135 either selects jump offset 127 or branch offset 129 based on this input. This output is then communicated to multiplexor 140.

If ISA unit 122 determines that the instruction is a sequential instruction, then this information is communicated to or-module 160. Or-module 160 performs an OR operation on the sequential bit from ISA unit 122 and the branch-not-taken bit received from microprocessor 12. This results in a positive one value if either 1) the instruction is a sequential instruction; or 2) if a branch was not taken for a branch instruction, which means the next address should be sequential. Or-module 160 communicates the result, either a zero or a one, to multiplexor 140.

Multiplexor 140 selects either an offset, determined by multiplexor 135, or a positive one offset based on the result from or-module 160. Multiplexor 140 communicates the selected offset to adder module 145. Adder module 145 sums the current address, which is known to prediction module 120, and the selected offset. Adder module 145 then communicates the predicted address to multiplexor 150.

If ISA unit 122 determined that the instruction is a jump-register or jump-and-link register instruction, then ISA unit 122 communicates a positive one value to multiplexor 150. In this circumstance, microprocessor 12 communicates the next address on address bus 16. Multiplexor 150 selects either the predicted address from adder module 145 or the address received on address bus 16 based on the value of the instruction signal from ISA unit 122. Memory 14 uses the selected address as the next address.

Figure 4:
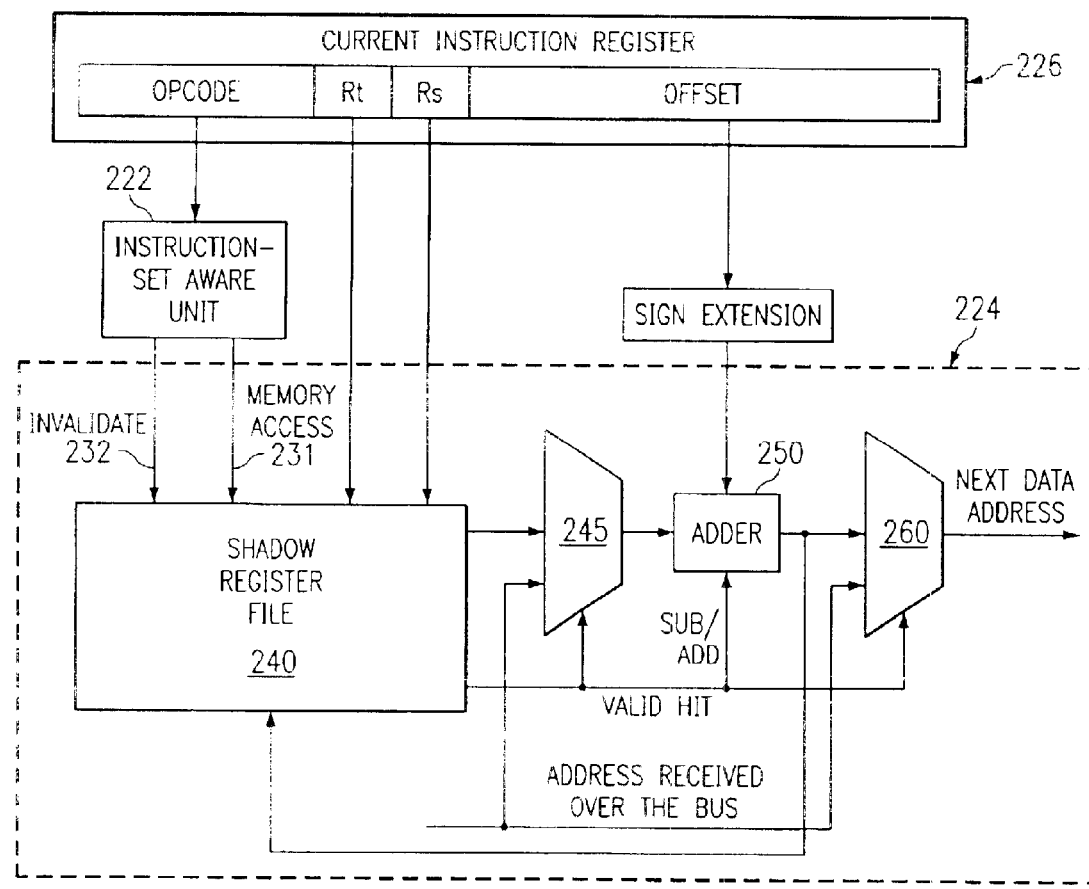
FIG. 4 is a block diagram illustrating one example of a prediction module for predicting data addresses.

FIG. 4 is a block diagram illustrating exemplary logic for a prediction module 220 that predicts data addresses to be sent across address bus 16. Prediction module 220 includes ISA unit 222 and calculation/prediction unit 224. Calculation/prediction unit 224 includes shadow register file 240 and various logic to predict the next data address based on the current instruction. The current instruction includes an OpCode, an $R_s$ field, an $R_t$ field, and an offset field. The $R_t$ field illustrating that a special register was used as a target register and invalidates one shadow register. The $R_s$ field is the register identifier of the actual register storing the desired value. This register identifier can be used to index into shadow register file 240.

Shadow register file 240 may include fewer shadow registers than actual registers in system 10. For example, microprocessor 12 may include thirty-two registers, but shadow register file 240 may include four shadow registers. Whenever a new register is used in a memory access instruction, one of the shadow registers may be unlinked from a prior actual register and linked to the new register. Therefore, the address stored in the new register, now linked to the shadow register, may be predicted. In one embodiment, a saturation counter may be used to avoid unlinking a shadow register from an actual register that is more frequently used.

ISA unit 222 determines if the current instruction is a memory access instruction and, if affirmative, then transmits a positive memory access signal 231 to calculation/prediction unit 224. ISA unit 222 may communicate an invalidate signal 232 to shadow register file 240. Invalidate signal 232 suggests to the calculation/prediction unit 224 that the expected register value may be invalid, or changed, due to an instruction after the last memory access from the register.

If invalidate signal 232 is negative, then calculation/prediction unit 224 extracts the $R_s$ identifier from the current instruction. Calculation/prediction unit 224 indexes into the shadow register file 240 based on the register identifier. If a shadow register is linked to the $R_s$ register, then calculation/prediction unit 224 loads the valid address from the linked shadow register and communicates the address to multiplexor 245. Otherwise, calculation/prediction unit 224 misses the target and communicates a zero as a valid hit signal to multiplexor 245. Multiplexor 245 selects the loaded address based on the valid hit signal and communicates the address to adder module 250. Calculation/prediction unit 224 extracts the offset from the current instruction for processing by adder module 250. If the valid hit signal is positive, then adder module 250 sums the extracted offset and the loaded address to predict the next address. The predicted address is communicated to multiplexor 260.

If the valid hit signal is not positive, then microprocessor 12 communicates the next address on address bus 16. Multiplexor 260 selects either the predicted address from adder module 250 or the address communicated on address bus 16, based on the valid hit signal, as the next address.

The preceding illustrations and accompanying descriptions provide exemplary circuit diagrams for implementing various predicting schemes. However, these figures are merely illustrative, and system 10 contemplates using any suitable combination and arrangement of elements for implementing various predicting schemes. Thus, these prediction modules may include any suitable combination and arrangement of elements for reducing communications on address bus 16. Moreover, the operations of the various illustrated prediction modules may be combined and/or separated as appropriate. For example, prediction module 20 may include coding logic that implements some or all of the coding schemes used within prediction module 120 and prediction module 220.

Figure 5:
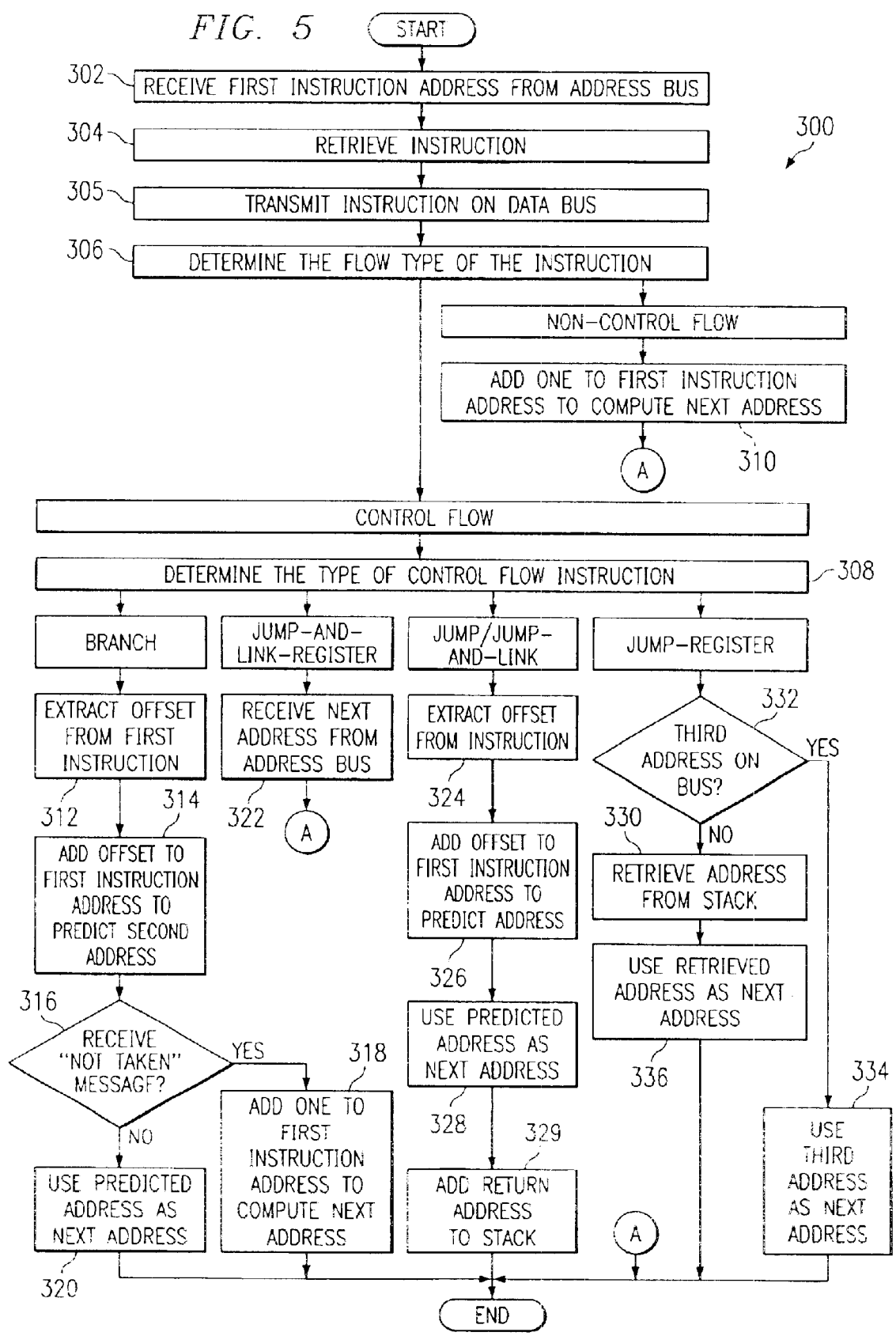
FIG. 5 is a flowchart illustrating a method for predicting instruction addresses.

FIG. 5 is a flowchart illustrating a method 300 for predicting instruction addresses. The following description focuses on the operation of prediction module 120, as this circuit diagram illustrates functional elements that provide for this prediction scheme. However, system 10 contemplates using any suitable combination and arrangement of functional elements for providing these operations, and these techniques can be combined with other techniques as appropriate.

Prediction module 120 receives a current instruction address from address bus 16 at step 302. Prediction module 120 retrieves a current instruction at step 304. Prediction module 120 transmits the retrieved instruction on data bus 18 at step 305. At step 306, prediction module 120 determines the flow type of the instruction. For example, the instruction may be a control flow instruction or a non-control flow instruction. If prediction module 120 determines that the instruction is a control flow instruction, then execution proceeds to step 308. If prediction module 120 determines that the instruction is a non-control flow instruction, then execution proceeds to step 310. A non-control flow instruction implies that the next instruction is fetched from a consecutive memory location. Therefore, at step 310, prediction module 120 adds 1 to the current instruction address to compute the next address. The computed second address is used as the next address.

Returning to the processing of control flow instructions, prediction module 120 determines the type of control flow instruction at step 308. Execution proceeds to step 312 if prediction module 120 determines that the instruction is a branch instruction. At step 312, prediction module 120 extracts branch offset 129 from the instruction. Prediction module 120 then adds the extracted offset 129 to the instruction address to predict a second address at step 314. As described in FIG. 2, this example prediction scheme assumes that the branch was taken. But if prediction module 120 receives a "branch not taken" message 123 at decisional step 316, then prediction module 120 adds 1 to the current instruction address to compute the next address at step 318. If prediction module 120 does not receive the "branch not taken" message 123 at decisional step 316, then prediction module 120 uses the predicted second address as the next address.

Returning to step 308, if prediction module 120 determines that the control flow instruction is a jump-and-link register instruction, then prediction module 120 receives the next address from address bus 16. If prediction module 120 determines that the instruction is a jump or a jump-and-link instruction, then execution proceeds to step 324. At step 324, prediction module 120 extracts jump offset 127 from the instruction. Prediction module 120 then adds the extracted offset 127 to the current instruction address to predict a second address at step 326. The predicted second address is used as the next address at step 328. Next, at step 329, prediction module 120 pushes the return address onto a stack. In certain embodiments, the return address in the stack may be used to predict the next address in response to a jump-register instruction.

If prediction module 120 determines that the instruction is a jump-register instruction, then, as described in FIG. 2, processor 12 may communicate a replacement third address on address bus 16. At decisional step 332, prediction module 120 determines if there is a third address on address bus 16. If there is not, then prediction module 120 retrieves the return address off the stack at step 330 and uses the retrieved return address as the next address at step 336. Otherwise, at step 334, prediction module 120 uses the received third address as the next address. It should be understood that, according to particular embodiments, if prediction module 120 does not utilize the retrieved return address, the return address is returned to the stack for later use. The combination of operation described in this flowchart will, in many circumstances, result in significantly reduced transitions, thus providing lower power consumption for circuits implementing these techniques.

Figure 6:
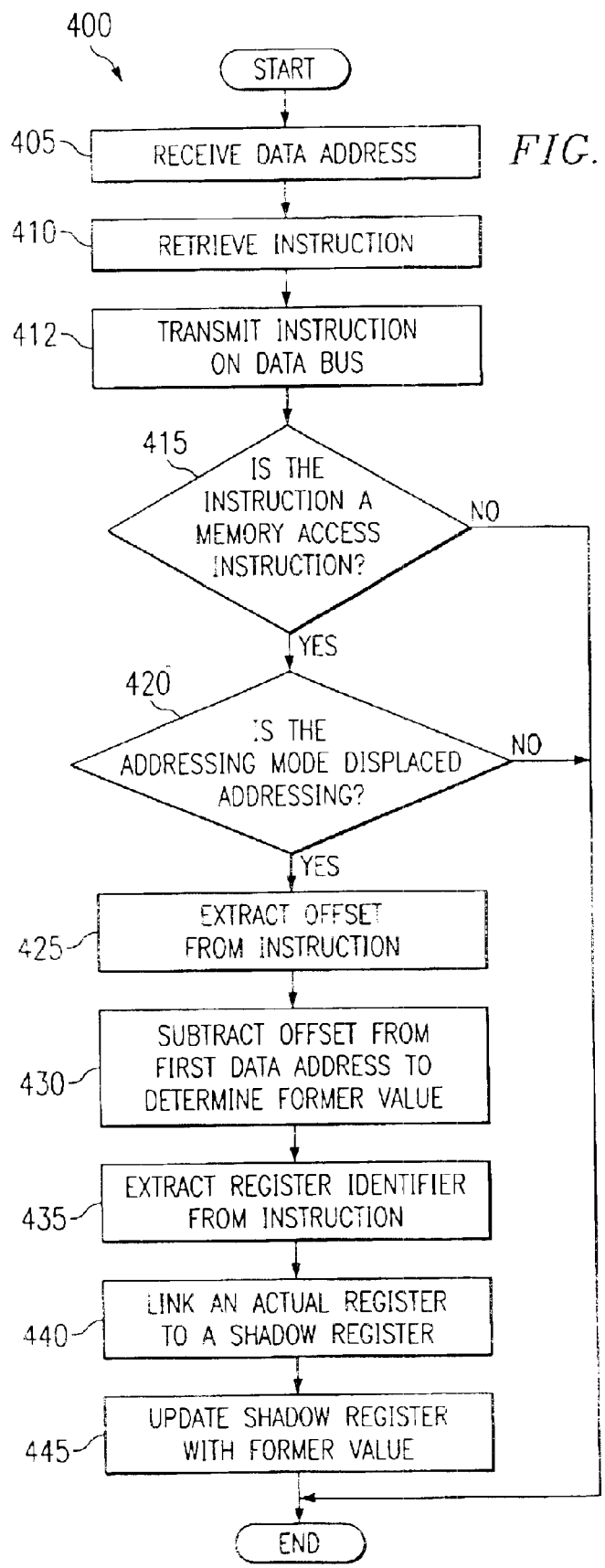
FIG. 6 is a flowchart illustrating a method for storing data addresses using a shadow register file.

FIG. 6 is a flowchart illustrating a method 400 for storing data addresses using shadow register file 240. Because method 400 operates similar to the functioning of prediction module 220, the following description will focus on the operation of prediction module 220 in performing method 400. However, as with the previous flowchart, system 10 contemplates using any appropriate combination and arrangement of logical elements implementing some or all of the described functionality.

Prediction module 220 receives a data address on address bus 16. Next, at step 410, prediction module 220 retrieves an instruction. Prediction module 220 transmits the retrieved instruction on data bus 18 at step 412. Prediction module 220 determines whether the instruction is a memory access instruction at decisional step 415. If the instruction is not a memory access instruction, then execution ends. Otherwise, execution proceeds to decisional step 420, where prediction module 220 determines if the addressing mode used is displaced addressing. In this embodiment, if displaced addressing is not used, then execution ends. If displaced addressing is used, then prediction module 220 continues to load shadow register file 240 and execution proceeds to step 425.

At step 425, prediction module 220 extracts an offset from the memory access instruction. Prediction module 220 then subtracts the extracted offset from the received address to determine a former value of the register at step 430. Prediction module 220 extracts a register identifier from the instruction at step 435. Next, at step 440, prediction module 220 links an actual register to one of the shadow registers based on the extracted register identifier. Often, the actual register stores the former value that was calculated in step 430. At step 445, prediction module 220 updates the linked shadow register with the former value to attempt to make the actual register and the shadow register coherent. This combination of operations will, in many circumstances, provide memory 14 the ability to predict addresses currently stored in the register cache, thus significantly reducing transitions and providing lower power consumption for circuits implementing these techniques.

FIG. 7 is a flowchart illustrating a method 500 for predicting data addresses using shadow register file 240. As in FIG. 6, the following description will focus on the operation of prediction module 220 in performing method 500. But system 10 contemplates using any appropriate combination and arrangement of logical elements implementing some of all of the described functionality.

Prediction module 220 retrieves an instruction at step 505. Prediction module 220 transmits the retrieved instruction on data bus 18 at step 507. At decisional step 510, prediction module 220 determines whether the instruction is a memory access instruction. If the instruction is not a memory access instruction, then execution ends. Otherwise, execution proceeds to decisional step 515, where prediction module 220 determines if the addressing mode used is displaced addressing. In this embodiment, if displaced addressing is not used, then execution ends. If displaced addressing is used, then prediction module 220 continues to predict the next address in steps 520–540.

At step 520, prediction module 220 extracts an offset from the received instruction. Prediction module 220 then extracts a register identifier from the received instruction. Based on the register identifier, prediction module 220 retrieves a value from one of the shadow registers in shadow register 240 at step 535. At step 540, prediction module 220 adds the extracted offset to the retrieved value to determine a predicted address.

Prediction module 220 then determines if the predicted address is correct by checking to see if invalidate signal 232 was received at decisional step 545. If invalidate signal 232 was received, then prediction module 220 receives a third address on address bus 16 at step 550. At step 555, prediction module 220 then uses the received third address as the next address. If no, or a negative, invalidate signal 232 was received, then prediction module 220 uses the predicted address as the next address. The combination of operations described in this flowchart will, in many circumstances, result in significantly reduced transitions, thus providing lower power consumption for circuits implementing these techniques.

The preceding flowcharts and accompanying descriptions illustrate exemplary methods of operation for predicting addresses using various prediction schemes. However, these methods are merely illustrative, and system 10 contemplates prediction module 20 implementing any suitable techniques for predicting subsequent addresses using some or all of the disclosed methods. Thus, any or all of these techniques may be used separately and/or together as appropriate to reduce switching activity on address bus 16. Moreover, because the flowcharts and descriptions are only illustrative, system 10 contemplates prediction module 20 using methods with additional steps, fewer steps, and/or different steps, so long as the methods remain appropriate.

Although the present invention has been described in detail, it should be understood that various changes, substitutions and alterations can be made hereto without departing from the sphere and scope of the invention as defined by the appended claims.

What is claimed is:

1. An instruction-set aware method for reducing transitions on an irredundant address bus, comprising:

receiving a first address on the irredundant address bus;

retrieving an instruction from a memory location indicated by the first address;

transmitting the instruction on a data bus;

determining a category of the instruction;

predicting a second address based on the first address, the instruction, and the category of the instruction;

monitoring a next value on the address bus;

determining whether a difference between the next value and the first address indicates a reduced-transition state of the address bus; and if the difference indicates the reduced-transition state, using the second address.

2. The method of claim 1, wherein the category of the instruction is control flow instruction and the second address indicates a memory location of a second instruction.

3. The method of claim 2, further comprising:

determining a type of control flow instruction, the type of control flow instruction being a selected one of branch, jump, jump-register, and jump-and-link; and wherein predicting the second address is further based on the determined type of control flow instruction.

4. The method of claim 3, wherein the type of control flow instruction is jump, and predicting the second address comprises:

extracting an offset from the instruction; and adding the offset to the first address to predict the second address.

5. The method of claim 4, further comprising pushing a return address onto a memory stack.

6. The method of claim 5, wherein the instruction is a first instruction and the method further comprises:

retrieving a second instruction, wherein the second instruction is a control flow instruction and wherein the type of the second instruction is jump-register;

retrieving the return address off the memory stack;
predicting a third address based on the retrieved return address; and
in response to receiving a fourth address on the address bus:
  replacing the predicted third address with the fourth address; and
  returning the retrieved return address to the stack.

7. The method of claim 3, wherein the type of control flow instruction is branch, and predicting a second address comprises:
  extracting an offset from the instruction; and
  adding the offset to the first address to predict the second address.

8. The method of claim 7, wherein, in response to receiving a branch-not-taken message, the method further comprises:
  adding one to the first address; and
  replacing the predicted second address with the updated first address.

9. The method of claim 1, wherein the category of the instruction is memory access instruction and the second address is a data address.

10. The method of claim 9, further comprising:
  loading a shadow register file with values from a plurality of actual registers, wherein the shadow register file comprises a plurality of shadow registers; and
  wherein predicting the second address is further based on the values stored in the shadow register file.

11. The method of claim 10, wherein the second address is predicted using displaced addressing.

12. The method of claim 11, wherein predicting the second address comprises:
  extracting an offset from the instruction;
  extracting a register identifier from the instruction, wherein the register identifier identifies one of a plurality of actual registers;
  extracting a value from one of the shadow registers based on the register identifier; and
  adding the offset to the value to predict the second address.

13. The method of claim 12, wherein, in response to receiving an invalid message, the method further comprises:
  receiving a fourth address on the address bus; and
  replacing the predicted second address with the fourth address.

14. The method of claim 11, wherein loading the shadow register file comprises:
  extracting an offset from the instruction;
  subtracting the offset from the first address to determine a value;
  extracting a register identifier from the instruction, wherein the register identifier identifies one of the plurality of actual registers;
  linking one of the shadow registers to the identified actual register based on the register identifier; and
  storing the value in the linked shadow register.

15. The method of claim 14, wherein the plurality of shadow registers is a subset of the plurality of actual registers used by a microprocessor.

16. The method of claim 15, further comprising updating a saturation counter to determine a subset of the actual registers to link to shadow registers in the shadow register file.

17. An instruction-set-aware prediction module for reducing transitions on an address bus comprising:
  an input operable to receive a first address on an address bus;
  an instruction-set-aware memory access module operable to retrieve ad instruction from a memory location indicated by the first address and to determine a category of the instruction;
  an output operable to transmit the instruction on a data bus;
  a calculation/prediction unit operable to predict a second address based, at least in part, on the first address, the instruction, and the category of the instruction, to monitor a next value received on the address bus, to determine whether a difference between the next value and the first address indicates a reduced-transition state of the address bus, and if the difference indicates the reduced-transition state, to the second address.

18. The prediction module of claim 17, wherein the category of the instruction is control flow instruction and the second address indicates a memory location of a second instruction.

19. The prediction module of claim 18, wherein the instruction-set-aware unit is further operable to determine a type of control flow instruction, the type of control flow instruction being a selected one of branch, jump, jump-register, and jump-and-link and wherein the calculation/prediction unit is further operable to predict the second address based on the determined type of control flow instruction.

20. The prediction module of claim 19, wherein the type of control flow instruction is jump and the calculation/prediction unit is further operable to extract an offset from the instruction and add the offset to the first address to predict the second address.

21. The prediction module of claim 20, wherein the calculation/prediction unit is further operable to push the first address onto a memory stack.

22. The prediction module of claim 21, wherein the instruction is a first instruction and the calculation/prediction unit is further operable to receive a second instruction, wherein the second instruction is a control flow instruction and wherein the type of the second instruction is jump-register, to retrieve the first address off the stack, to predict a third address based on the retrieved return address, and in response to receiving a fourth address on the address bus, to replace the predicted third address with the fourth address and to return the retrieved return address to the stack.

23. The prediction module of claim 19, wherein the type of control flow instruction is branch and the calculation/prediction unit is further operable to extract an offset from the instruction and add the offset to the first address to predict the second address.

24. The prediction module of claim 23, wherein, in response to receiving a branch-not-taken message, the calculation/prediction unit is further operable to add one to the first address and replace the predicted second address with the updated first address.

25. The prediction module of claim 17, wherein the category of the instruction is memory access instruction and the second address is a data address.

26. The prediction module of claim 25, further comprising:
  a shadow register file, wherein the shadow register file comprises a plurality of shadow registers, each shadow register storing a value from an actual register; and wherein the calculation/prediction unit is further operable to predict the second address is based on the values stored in the shadow register file.

27. The prediction module of claim 26, wherein the second address is predicted using displaced addressing.

28. The prediction module of claim 27, wherein the calculation/prediction unit is further operable to extract an offset from the instruction, to subtract the offset from the first address to determine a third address, to extract a register identifier from the instruction, wherein the register identifier identifies one of the plurality of actual registers, to link one of the shadow registers to the identified actual register based on the register identifier, and to store the third address in the linked shadow register.

29. The prediction module of claim 28, wherein the plurality of shadow registers is a subset of the plurality of actual registers used by a microprocessor.

30. The prediction module of claim 29, wherein the calculation/prediction unit is further operable to update a saturation counter to determine a subset of the actual registers to link to shadow registers in the shadow register file.

31. The prediction module of claim 27, wherein the calculation/prediction unit is further operable to extract an offset from the instruction, to extract a register identifier from the instruction, wherein the register identifier identifies one of a plurality of actual registers, to extract a value from one of the shadow registers based on the register identifier, and to add the offset to the value to predict the second address.

32. The prediction module of claim 31, wherein, in response to receiving an invalid message:
the input is further operable to receive a fourth address on the address bus; and
the calculation/prediction unit is further operable to replace the predicted second address with the fourth address.

33. A computer-readable medium having computer-executable instructions for performing a method to reduce transitions on an irredundant address bus comprising:
receiving a first address on the irredundant address bus;
retrieving an instruction from a memory location indicated by the first address;
transmitting the instruction on a data bus;
determining a category of the instruction; and
predicting a second address based on the first address, the instruction, and the category of the instruction;
monitoring a next value on the address bus;
determining whether a difference between the next value and the first address indicates a reduced-transition state of the address bus; and
if the difference indicates the reduced-transition state, use the second address.

34. The computer-readable medium of claim 33, wherein the category of the instruction is control flow instruction and the second address indicates a memory location of a second instruction.

35. The computer-readable medium of claim 34, the method further comprising:
determining a type of control flow instruction, the type of control flow instruction being a selected one of branch, jump, jump-register, and jump-and-link; and
wherein predicting the second address is further based on the determined type of control flow instruction.

36. The computer-readable medium of claim 35, wherein the type of control flow instruction is jump, and wherein predicting the second address comprises:
extracting an offset from the instruction; and
adding the offset to the first address to predict the second address.

37. The computer-readable medium of claim 36, the method further comprising pushing a return address onto a memory stack.

38. The computer-readable medium of claim 37, wherein the instruction is a first instruction, the method further comprising:
retrieving a second instruction, wherein the second instruction is a control flow instruction and wherein the type of the second instruction is jump-register;
retrieving the return address off the memory stack;
predicting a third address based on the retrieved return address; and
in response to receiving a fourth address on the address bus:
replacing the predicted third address with the fourth address; and
returning the retrieved return address to the stack.

39. The computer-readable medium of claim 35, wherein the type of control flow instruction is branch, and wherein predicting a second address comprises:
extracting an offset from the instruction; and
adding the offset to the first address to predict the second address.

40. The computer-readable mediun of claim 39, wherein, in response to receiving a branch-not-taken message, the method further comprises adding one to the first address and replace the predicted second address with the updated first address.

41. The computer-readable medium of claim 33, wherein the category of the instruction is memory access instruction and the second address is a data address.

42. The computer-readable medium of claim 41, the method further comprising:
loading a shadow register file with values from a plurality of actual registers, wherein the shadow register file comprises a plurality of shadow registers; and
wherein predicting the second address is further based on the value stored in the shadow register file.

43. The computer-readable medium of claim 42, wherein the second address is predicted using displaced addressing.

44. The computer-readable medium of claim 43, wherein loading the shadow register file comprises:
extracting an offset from the instruction;
subtracting the offset from the first address to determine a value;
extracting a register identifier from the instruction, wherein the register identifier identifies one of the plurality of actual registers;
linking one of the shadow registers to the identified actual register based on the register identifier; and
storing the value in the linked shadow register.

45. The computer-readable medium of claim 44, wherein the plurality of shadow registers is a subset of the plurality of actual registers used by a microprocessor.

46. The computer-readable medium of claim 45, the method further comprising: updating a saturation counter to determine a subset of the actual registers to link to shadow registers in the shadow register file.

47. The computer-readable medium of claim 43, wherein predicting the second address comprises:
extracting an offset from the instruction;

extracting a register identifier from the instruction, wherein the register identifier identifies one of a plurality of actual registers;

extracting a value from one of the shadow registers based on the register identifier; and adding the offset to the value to predict the second address.

48. The computer-readable medium of claim 47, wherein, in response to receiving an invalid message, the method further comprises:

receiving a fourth address on the address bus; and replacing the predicted second address with the fourth address.

49. An instruction-set-aware prediction module for reducing transitions on an address bus comprising:

means for receiving a first address on an address bus;

means for retrieving an instruction from a memory location indicated by the first address;

means for transmitting the instruction on a data bus;

means for determining a category of the instruction;

means for predicting a second address based on the first address, the instruction, and the category of the instruction;

means for monitoring a next value of the address bus;

means for determining whether a difference between the next value and the first address indicates a reduced-transition state of the address bus; and means for, it the difference indicates the reduced-transition state, using the second address.

50. An instruction-set-aware method for reducing transitions on an irredundant address bus, comprising:

receiving a first address on an irredundant address bus;

retrieving an instruction from a memory location indicated by the first address;

transmitting the instruction on a data bus;

determining a category of the instruction;

in response to the category of the instruction being control flow instruction, determining a type of control flow instruction, the type of control flow instruction being a selected one of branch, jump, jump-register, and jump-and-link; and in response to the type of control flow instruction being jump:

extracting an offset from the instruction; and adding the offset to the first address to predict a second address;

in response to the type of control flow instruction being branch:

extracting an offset from the instruction; and adding the offset to the first address to predict the second address; and in response to receiving a branch-not-taken message:

adding one to the first address; and replacing the predicted second address with the updated first address.

* * * * *

UNITED STATES PATENT AND TRADEMARK OFFICE
CERTIFICATE OF CORRECTION

PATENT NO. : 6,907,511 B2 Page 1 of 1
APPLICATION NO. : 10/342418
DATED : June 14, 2005
INVENTOR(S) : Fallah et al.

It is certified that error appears in the above-identified patent and that said Letters Patent is hereby corrected as shown below:

Column 10, Line 30, after "set" insert -- - --.
Column 10, Line 32, after "address on" delete "the" and insert -- an --.
Column 12, Line 7, after "retrieve" delete "ad" and insert -- an --.
Column 12, Line 19, after "state, to" insert -- use --.
Column 13, Line 44, after "instruction;" delete "and".
Column 15, Line 26, after "value" delete "of" and insert -- on --.
Column 15, Line 30, after "means for," delete "it" and insert -- if --.

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 6,907,511 B2
APPLICATION NO. : 10/342418
DATED : June 14, 2005
INVENTOR(S) : Fallah et al.

It is certified that error appears in the above-identified patent and that said Letters Patent is hereby corrected as shown below:

Column 10, Line 30, after "set" insert -- - --.
Column 10, Line 32, after "address on" delete "the" and insert -- an --.
Column 12, Line 7, after "retrieve" delete "ad" and insert -- an --.
Column 12, Line 19, after "state, to" insert -- use --.
Column 13, Line 44, after "instruction;" delete "and".
Column 15, Line 26, after "value" delete "of" and insert -- on --.
Column 15, Line 30, after "means for," delete "it" and insert -- if --.

Signed and Sealed this

Second Day of January, 2007

JON W. DUDAS
*Director of the United States Patent and Trademark Office*